United States Patent [19]

Sbicca

[11] 3,904,120

[45] Sept. 9, 1975

[54] SPRINKLER HEAD STABILIZER AND PROTECTOR

[76] Inventor: Peter J. Sbicca, 2895 Lorain Rd., San Marino, Calif. 91108

[22] Filed: July 26, 1974

[21] Appl. No.: 492,040

Related U.S. Application Data

[63] Continuation-in-part of Ser. No. 423,940, Dec. 12, 1973, abandoned.

[52] U.S. Cl. .............................. 239/201; 239/288.5
[51] Int. Cl.² ................ A01G 25/06; B05B 15/06
[58] Field of Search .......... 239/201, 202, 203, 204, 239/288.5

[56] References Cited
UNITED STATES PATENTS

| | | | |
|---|---|---|---|
| 1,105,993 | 8/1914 | Munson | 239/201 |
| 2,751,250 | 6/1956 | Block | 239/201 |
| 3,015,448 | 1/1962 | Hurless | 239/201 |
| 3,018,057 | 1/1962 | Anderson | 239/201 |
| 3,703,992 | 11/1972 | Merryweather | 239/201 |
| 3,762,642 | 10/1973 | Di Santo | 239/288.5 |

*Primary Examiner*—Lloyd L. King
*Attorney, Agent, or Firm*—Sellers and Brace

[57] ABSTRACT

A thick, plastic disc adapted to be recessed into a lawn about a sprinkler head to stabilize the latter and prevent grass blades from interfering with the operation of the sprinkler. The disc is molded in one piece from pliant polyurethane or the like plastic immune to degradation from moisture, sunlight and climatic conditions and readily withstanding abrasion and impact blows. A thick guard ring integral with the disc safeguards the sprinkler from objects passing over the lawn while the remaining exposed surface of the disc supports a multiplicity of grass simulating protrusions. The disc includes a keeper ring in direct engagement with the underside of the sprinkler head and sufficiently pliant to permit assembly of the disc over an installed sprinkler head.

15 Claims, 8 Drawing Figures

SPRINKLER HEAD STABILIZER AND PROTECTOR

This application is a continuation-in-part of my pending application Ser. No. 423,940, filed Dec. 12, 1973, n... abandoned and bearing the same title as this application.

This invention relates to sprinkler head protectors, and more particularly to an improved, molded plastic disc adapted to be deeply recessed into the ground about a sprinkler head to stabilize and protect the latter from damage by objects passing over or in contact therewith and having a simulated grass upper surface wide enough to keep actual grass blades from interfering with the water spray.

Users of lawn sprinkler heads recessed into a lawn are confronted with the vexatious problem of grass blades obstructing the fine spray of water discharging therefrom. Moreover such sprinkler heads are easily damaged by lawn mowers and other objects engaging these heads while passing over the lawn. Many proposals have been made in attempts to avoid and solve these problems but all of the prior proposals are subject to various shortcomings and disadvantages sought to be avoided by the present invention. Underground sprinkler systems of the type presenting these problems are commonly installed using plastic pipes and fittings and terminating in either brass or plastic sprinkler heads. These fittings, sprinkler heads and even the plastic pipe are easily broken by lawn mowers or persons stepping on the sprinkler head while the ground is soft or wet. The broken or damaged part may be relatively inexpensive but the cost of replacing it is usually very substantial, to leave unmentioned the damage to the lawn that can result if left unwatered until repair services can be had. Proposals heretofore made to avoid these hazards involve expedients difficult to install, or devices which are easily broken or displaced by an object coming in contact therewith, or devices which are so heavy and bulky as to be difficult and costly to install. Another shortcoming of prior proposals is the fact that the protector is unsightly and contrasts strikingly with a lawn, or the protector is so small that it fails to prevent grass from overgrowing the sprinkler head and interfering with its operation. Other devices are made of rigid material and are so constructed as to damage the blades of lawn mowers or other objects coming in contact therewith while others made of softer materials deteriorate after a short period of use because of attack by sunlight and climatic conditions generally.

The present invention avoids the disadvantages and shortcomings of prior proposals and comprises a thick, large diameter ring molded from a pliant plastic composition which is not subject to degradation by ultraviolet light, the sun's rays or climatic conditions, including high summer temperatures and sub-zero winter temperatures. Polyurethane meets these requirements in a highly satisfactory degree and yet is rigid and strong enough to provide an excellent anchorage for the sprinkler head and the plastic fittings commonly associated therewith. Desirably, the disc includes an internal lightweight reinforcing and filler ring of inexpensive material selected for its ability to strengthen the disc and to take the place of the substantially more expensive plastic in which the filler ring is embedded. One preferred embodiment of the disc also includes an upwardly protruding guard ring encircling the sprinkler head and extending materially above the exterior end of the head thereby to prevent contact of the latter by objects passing over the sprinkler.

The remainder of the exposed end of the disc preferably includes flexible grass simulating protrusions and the entire disc is dyed to match the color of the lawn. Typically one preferred embodiment of the disc has a thickness corresponding generally with the axial length of the sprinkler head thereby assuring adequate strength in the disc to protect the sprinkler components without necessitating removing dirt to a depth below the threaded end of the riser conduit. Accordingly, the protector disc is easily installed by removing dirt to the lower end of the sprinkler head and thereafter detaching the sprinkler head temporarily and securing the protector in place thereover by reassembly of the head itself. The disc may and preferably is provided intermediate the opposite ends of its central opening with inwardly projecting flange means having a radial surface to engage the underside of the rim portion of a sprinkler head. Typically this flange is V-shaped in cross-section and is sufficiently flexible and deformable to permit its assembly over an installed head while held canted relative to the head axis. Accordingly the disc is readily assembled by a novice without need for detaching the head and after temporarily removing extra soil from one side of the sprinkler head. Another feature of the invention is the fact that the protector disc is rigidly cut or sawed along a desired contour to tailor it for assembly immediately beside curbing, pavement or other obstructions along the edge of the lawn.

Accordingly, it is a primary object of the present invention to provide an improved, rugged, highly durable, non-degradable sprinkler protector.

Another object of the invention is the provision of a sprinkler head stabilizer, and protector utilizing a wide area of the lawn surrounding the sprinkler heads to stabilize the head and including a guard ring on a higher level than the sprinkler head as well as artificial grass blades tailored to avoid interference with the operation of the sprinkler.

Another object of the invention is the provision of a sprinkler head protector molded from resilient plastic immune to attack by the elements and readily tailorable to fit about a sprinkler head located close to curbing or pavement.

Another object of the invention is the provision of a sprinkler head protector and grass guard formed in major part of deformable plastic material immune to sunlight and the elements and including keeper flange means engageable beneath the rim of a conventional sprinkler head and forcibly insertable over an installed head.

Another object of the invention is the provision of a molded plastic guard disc for a lawn sprinkler head having an embedded filler ring of inexpensive material therein taking the place of the relatively more expensive plastic material.

These and other more specific objects will appear upon reading the following specification and claims and upon considering in connection therewith the attached drawing to which they relate.

Referring now to the drawing in which a preferred embodiment of the invention is illustrated:

Figure 1:
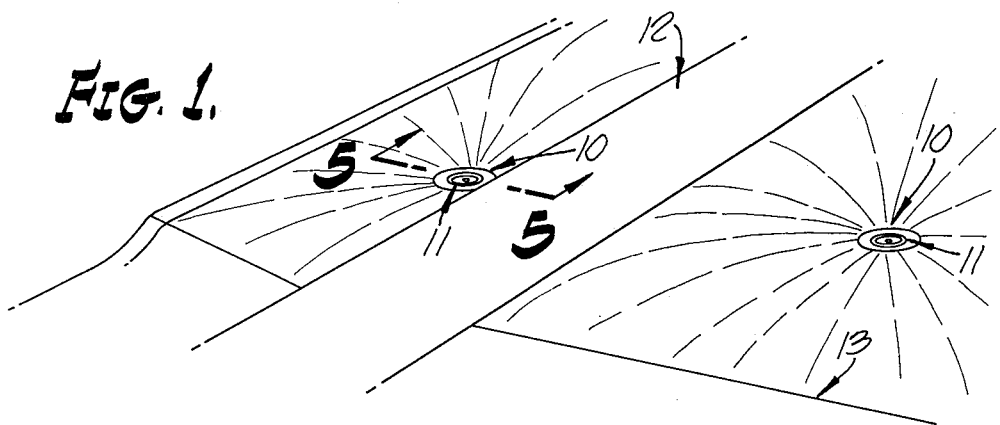
FIG. 1 is a diagrammatic perspective view showing one preferred embodiment of the invention sprinkler head protector installed close to the pavement and another one thereof installed in a location spaced inwardly from the edge of the lawn.

Referring initially more particularly to FIG. 1, there is shown an illustrative embodiment of the invention stabilizer and protector, designated generally 10, installed about two typical buried sprinkler heads 11. The left hand sprinkler head is installed in a parkway lawn close to the sidewalk 12, whereas the right hand sprinkler head 11 is located several feet inwardly from the sidewalk and from a driveway 13. In each case, protector 10 is embedded or countersunk into the lawn so that the upper surface of its main body lies generally in the plane of the ground.

Figure 2:
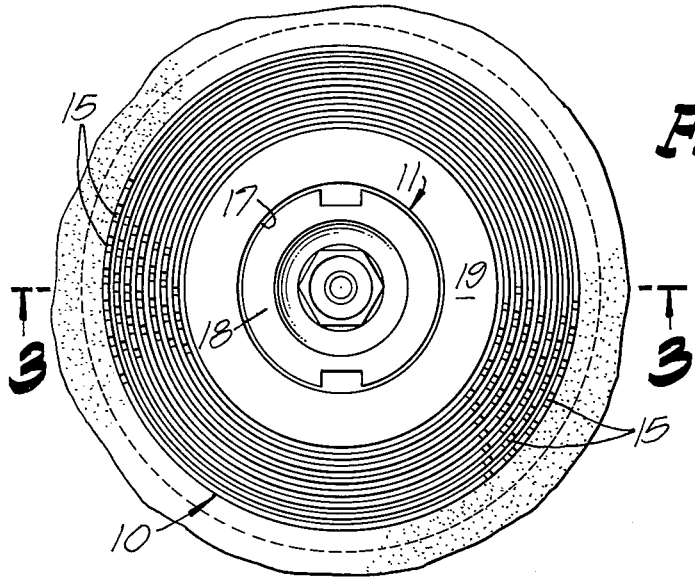
FIG. 2 is a top plan view on an enlarged scale of the protector installed on a sprinkler head.
Figure 4:
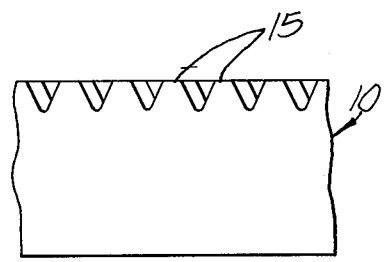
FIG. 4 is a fragmentary side elevational view taken along line 4—4 on FIG. 3.
Figure 3:
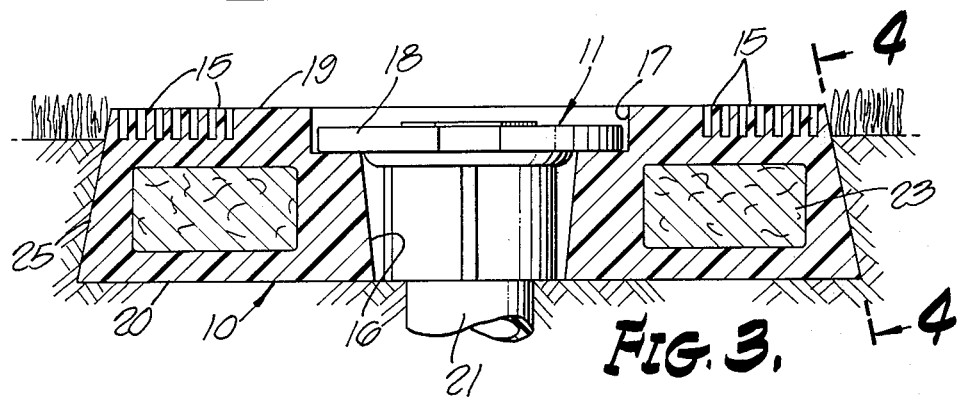
FIG. 3 is a cross-sectional view taken along line 3—3 on FIG. 2.
Figure 5:
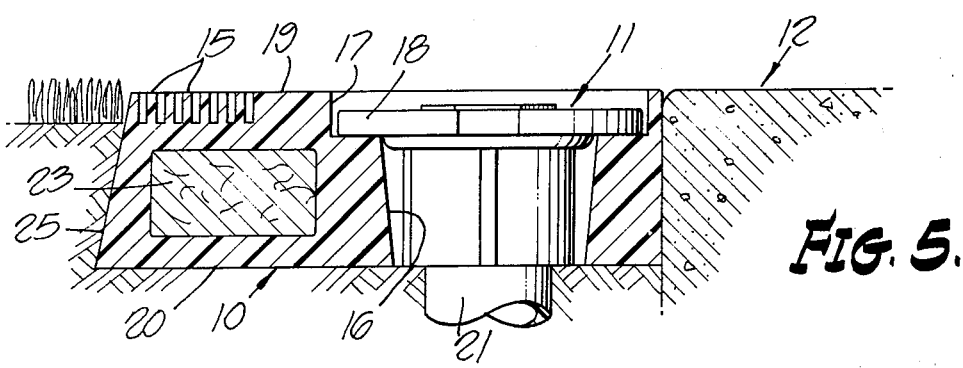
FIG. 5 is a cross-sectional view on an enlarged scale taken along line 5—5 on FIG. 1.

Referring now to FIGS. 2, 3 and 4, it will be understood that protector disc 10 is preferably molded in one piece from flexible, resilient polyurethane or the like plastic composition known to be highly durable and immune to attack by ultraviolet light and not subject to degradation by long exposure to the elements and wide range temperature changes including sub-zero temperatures and summer temperatures in excess of 100°F. Polyurethane is found to meet these requirements in a highly satisfactory degree and to remain pliant, soft and supple over many seasons. When molded to an overall thickness approximating the axial length of a conventional sprinkler head 11, its main body has excellent rigidity yet its simulated grass protrusions 15, 15 flex readily without risk of damage or fracture despite the most severe and oft-repeated flexing. For example, these protrusions flex readily under the weight of a person walking thereacross and present no hazard or risk of injury to children or animals at play on a lawn equipped with these protectors.

A polyether-based polyurethane elastomer found to give excellent results has a hardness on the Shore A2 scale of 55; an ultimate tensile strength of 570 psi; a minimum elongation of 400%; an elongation set of 4.5% at break; and a minimum tear strength of 85 pli, Die C.

Disc 10 is provided with a central opening 16 which includes a radial recess 17 about its upper end accommodating the radial flange 18 typically surrounding the upper end of the sprinkler head 11. Recess 17 is encircled by a high and thick guard ring 19 the upper end surface of which is located in a plane spaced substantially above the upper surface of head 11. Owing to the width and thickness of guard ring 19, it readily supports the weight of a person walking over the head or the weight of a lawn mower or other object rolling over the protector, thereby preventing the foot or other heavy object coming in contact with the sprinkler head. Also, the weight of such an object coming to bear on the protector is transferred directly to its wide area base 20 and thence into the ground without any of this weight coming to bear on the sprinkler head or on its riser 21. Likewise, non-vertical blows and forces impacting against protector 10 are transferred into the ground without being imparted to the sprinkler head or to its supporting riser pipe 21. It will be understood that riser 21 may be either a metal nipple or a threaded plastic tube which projects upwardly into and mates with the customary internal threads in the shank of the sprinkler head.

Desirably, the center portion of disc 10 is occupied by a filler 23 of any suitable lightweight non-flexible material such as fiberboard, presswood, or the like material fully embedded in the surrounding polyurethane or other plastic material adding materially to the rigidity of disc 10 and economizing on the amount of plastic required for its manufacture. It will be understood that both the plastic body of the disc as well as filler 23 is readily cut or sawn to tailor a peripheral portion of the protector for assembly about a sprinkler head located close to an obstruction such as the sidewall 12. An additional feature of the protector is the frusto-conica contour 25 of its periphery which desirably is substantially larger in diameter at its base than at its upper end. A portion of the lawn engaged with this surface aids very materially in holding the protector firmly anchored and against tilting out of the ground if weight is applied to one rim portion of the protector.

installation of the protector is readily accomplished. Preferably, this is done by depressing a circular die into the ground approximating the larger diameter of the protector to a depth corresponding to the thickness of the protector. The soil is then removed from the interior of this circle to an appropriate depth flush with the lower end of the sprinkler head thereby, the threaded upper end of riser 21 then being located substantially above the bottom of the recess 17. Additional dirt, if needed, is then filled in and tamped about the gap around the periphery of the protector thereby completing the installation.

Figure 6:
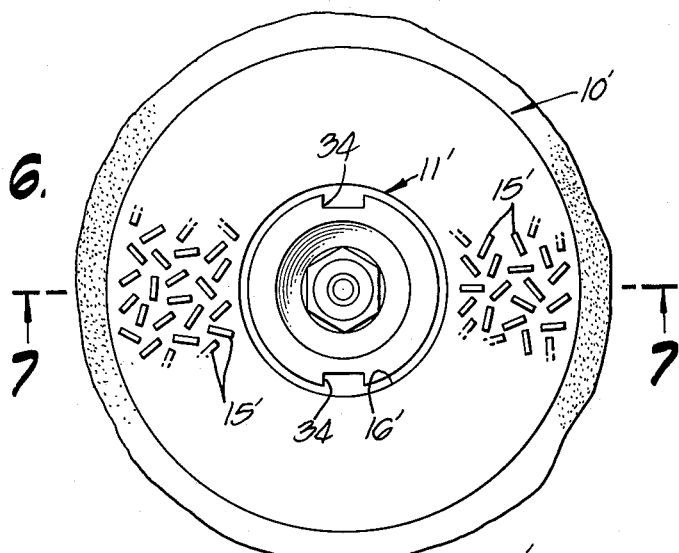
FIG. 6 is a top plan view of a second preferred embodiment of the invention.
Figure 7:
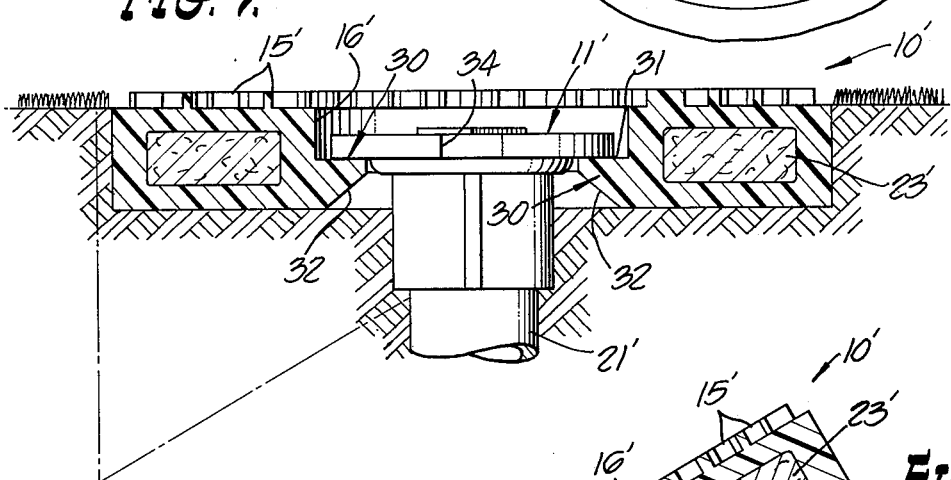
FIG. 7 is a cross sectional view on an enlarged scale taken along line 7—7 on FIG. 6.
Figure 8:
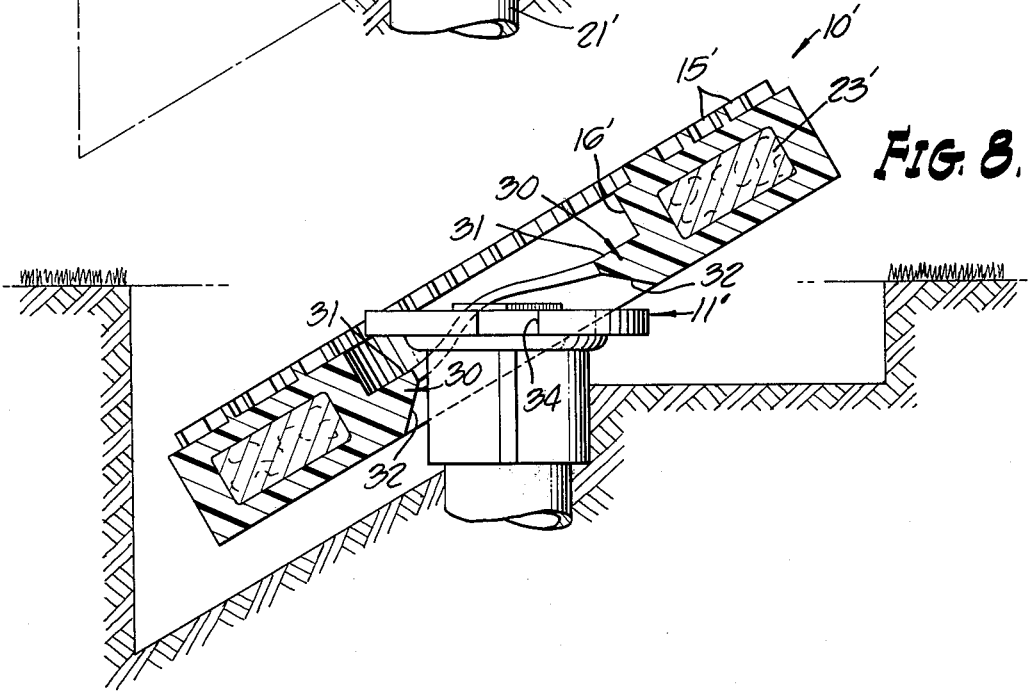
FIG. 8 is a cross-sectional view similar to FIG. 7 showing the protector disc while held canted; and during assembly over an installed sprinkler head.

Referring now to FIGS. 6–8, there is shown a second preferred embodiment of the invention sprinkler head stabilizer and protector disc designated generally 10'. This protector disc is generally similar to that described above but differs in certain details. The protector is molded from the same plastic composition immune to degradation from sunlight and the elements and preferably includes an inexpensive filler ring 23'. Projecting from the upper surface in random array are a multiplicity of resilient and flexible protrusions 15' representing blades of grass.

The protector disc is provided with a central opening 16' the upper portion of which is sized to readily accommodate and seat the radially disposed flange of the sprinkler head 11'. Projecting inwardly from the sidewall of opening 16' is flange means 30 having a radial upper surface 31 and a downwardly and outwardly flaring conical lower surface 32. Radial surface 31 is positioned to engage and firmly seat against the underside of the peripheral portion of sprinkler head 11' in the manner made clear by FIG. 7, whereas the conical surface 32 serves as a centering pilot to facilitate assembly of the protector disc 10' over an installed sprinkler head 11' from its top or upper end, an operation which is accomplished easily and readily in a manner which will now be described.

Referring to FIG. 8, it will be noted that the lawn surrounding an installed sprinkler head 11' has been excavated in the manner there shown, one portion being excavated to a depth corresponding generally to the thickness of the main body of the disc and the remaining portion being excavated to a considerably greater depth and along an inclined plane. This deeper side is preferably located to one side of a diameter passing through the wrenching notches 34, 34 spaced diametrically of one another as is shown in FIG. 6. The excavation having been prepared, the protector disc is canted to the angle shown in FIG. 8 and then lowered over the sprinkler head until the relatively thin inner edge of the radial flange can be easily pressed into the wrenching notches 34, 34. Thereafter, the disc is pressed downwardly and tilted clockwise to a horizontal position. This deforms and cams the lip portion of the resilient and flexible flange 30 along one half portion of its circumference over the rim of the sprinkler head until all portions of flange 30 are located below the rim of the sprinkler.

Thereafter, the soil is replaced and firmly compacted beneath and along the rim portions of disc 11'. The base ends of the grass blade protrusions will then lie substantially in the plane of the adjacent ground and the sprinkler head will be firmly but securely supported from the underside of its rim.

Experience has shown that this modified mode of supporting and stabilizing the sprinkler head is fully as effective as the substantially thicker construction shown in FIGS. 1–5. Moreover, and of particular importance, is the fact that the protector can be installed quickly without need for tools or without removing the sprinkler head with the risk of foreign matter entering the riser pipe and interfering with the subsequent functioning of the sprinkler head.

While the particular sprinkler head stabilizer and protector herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

I claim:

1. A sprinkler head stabilizer and grass guard comprising: a thick disc of molded non-rigid pliant plastic material having a diameter of the order of double that of a lawn sprinkler head and adapted to be mounted in a countersink in the lawn not deeper than the sprinkler head, said disc having a central opening therethrough radially recessed at its upper end, said opening being sized to seat a radially flanged sprinkler head, the upper surface of said disc having a multiplicity of long thin flexible protrusions integral with and projecting upwardly therefrom simulating blades of grass, a thick wide guard ring means encircling the upper end of said central opening with its upper end lying in a plane spaced substantially above the upper end of a sprinkler head when seated in said central opening and serving to prevent the blades of a lawn mower from contacting the sprinkler head while passing thereover, and said disc being adapted to be recessed into the lawn with the lower ends of said simulated grass blades generally flush with the ground.

2. A stabilizer and grass guard as defined in claim 1 characterized in that said disc includes a reinforcing ring embedded therein.

3. A stabilizer as defined in claim 1 characterized in that said simulated blades of grass surrounding said guard ring means and having a height at least as great as the height of said guard ring means.

4. A stabilizer as defined in claim 1 characterized in that said plastic is compounded of material highly resistant to attack by sunlight and wide-range climatic temperature and weather changes.

5. A stabilizer as defined in claim 1 characterized in that said plastic comprises a polyurethane composition.

6. A stabilizer as defined in claim 4 characterized in that said disc readily cuts to shape by a saw or the like cutting instrument to tailor the same for assembly about a sprinkler head located closely adjacent the edge of a lawn bounded by curbing, pavement or the like obstruction.

7. A stabilizer as defined in claim 1 characterized in that the periphery thereof is frusto-conical and substantially larger in diameter at the lower end thereof.

8. A polyurethane disc adapted to be assembled over an installed lawn sprinkler head and cooperating therewith to stabilize and protect the sprinkler head against damage while preventing grass from growing close enough to the head to interfere with the operation thereof, said polyurethane disc being pliant and molded in one piece, said disc having an opening to receive a sprinkler head and recessed at one end to seat against the underside of the radial flange encircling the upper end of a conventional sprinkler head, the upper end of said disc having a diameter not materially less than double the diameter of a sprinkler head usable therewith and having a multiplicity of flexible protrusions simulating blades of grass projecting therefrom, and said central opening having flange means projecting inwardly from the side thereof which flange means is deformable to permit forced assembly of said disc over the rim of an installed sprinkler head and including an upwardly facing surface spaced substantially below the upper end of said opening and adapted to rest against a major portion of the underside of the rim portion of a sprinkler head and cooperable therewith to stabilize the sprinkler head.

9. A disc as defined in claim 8 characterized in having a filler ring of lightweight tough material embedded therewithin to stiffen said disc.

10. A disc as defined in claim 8 characterized in having a thickness corresponding generally with the axial length of a sprinkler head usable therewith.

11. A sprinkler head stabilizer and grass guard comprising: a thick disc of molded non-rigid pliant plastic material having a diameter of the order of double that of a lawn sprinkler head and adapted to be mounted in a countersink in the lawn not deeper than the sprinkler head, said disc having a central opening therethrough radially recessed at its upper end, said opening being sized to seat a radially flanged sprinkler head, the upper surface of said disc having a multiplicity of long thin flexible protrusions integral with the projecting upwardly therefrom simulating blades of grass, filler means of non-flexible material concealed within said disc and occupying a major portion of the interior thereof, and said disc being adapted to be recessed into the lawn with the upper surface thereof located on a plane spaced above the highest portion of the sprinkler head to safeguard the sprinkler head from a lawn mower or contact with shoes of persons walking across the lawn.

12. A sprinkler head stabilizer and disc as defined in claim 11 characterized in that said recessed central opening is provided with inwardly projecting deformable flange means having a wide generally radial upwardly facing surface positioned to underlie and seat against the underside of the rim of a sprinkler head, and the under side of said flange means flaring downwardly and outwardly to provide guide means to facilitate the assembly of said grass guard over an installed sprinkler head.

13. A sprinkler head stabilizer and grass guard as defined in claim 11 characterized in that said central opening includes inwardly projecting deformable flange means and diametrically opposed portions of which can be deformed to permit assembly of said grass guard over an installed sprinkler head while the grass guard is forcibly lowered thereover in a plane tilted obliquely to the axis of the sprinkler head.

14. A sprinkler head stabilizer and grass guard as defined in claim 13 characterized in that the under side of said flange means flares downwardly and outwardly to provide a pilot effective to guide and center said grass guard within said central opening during the assembly thereof about an installed sprinkler head.

15. A polyurethane disc adapted to be assembled over an installed lawn sprinkler head and cooperating therewith to stabilize and protect the sprinkler head against damage while preventing grass from growing close enough to the head to interfere with the operation thereof, said polyurethane disc being pliant and molded in one piece, said disc having an opening to receive a sprinkler head and recessed at one end to seat against the underside of the radial flange encircling the upper end of a conventional sprinkler head, the upper end of said disc having a diameter not materially less than double the diameter of a sprinkler head usable therewith and having a multiplicity of flexible protrusion simulating blades of grass projecting therefrom, said sprinkler head receiving opening including keeper flange means engageable with the under side of the rim portion of a sprinkler head and cooperating therewith to hold said disc assembled over a sprinkler head, and said keeper flange being sufficiently pliant and flexible to permit assembly of the disc from the upper end of an installed sprinkler head thereby avoiding the need to detach the sprinkler head to permit assembly of said disc thereabout.

* * * * *